J. J. LEPPER.
MACHINE FOR CUTTING CORN PADS.
APPLICATION FILED JULY 23, 1917.
1,269,619.
Patented June 18, 1918.
2 SHEETS—SHEET 1.
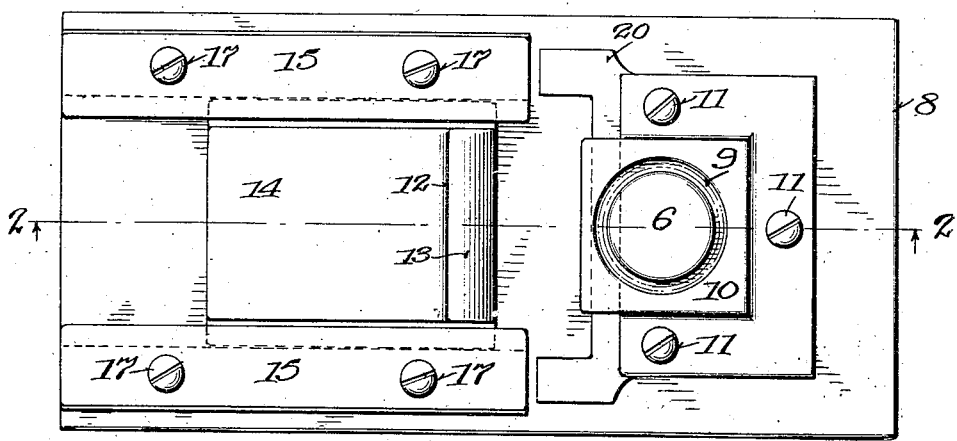
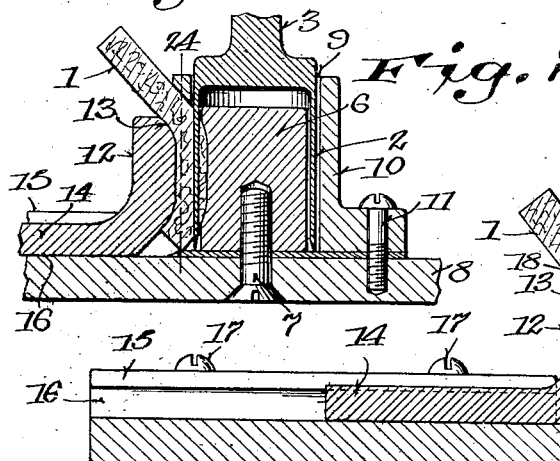
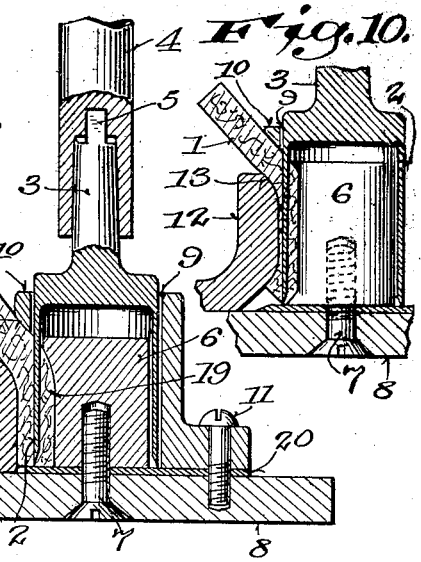
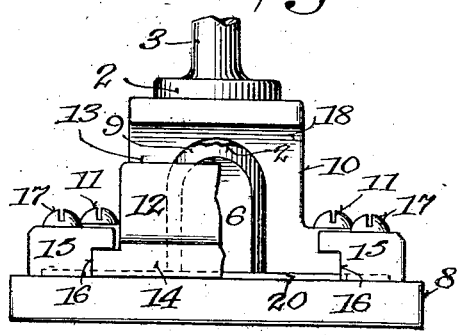
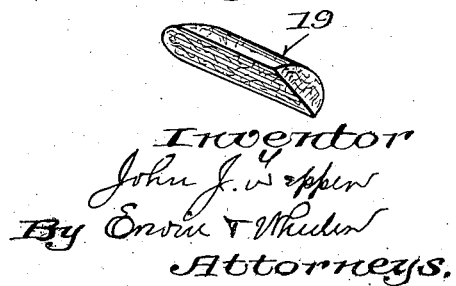
Inventor
John J. Lepper
By Enwin & Wheeler
Attorneys.

J. J. LEPPER.
MACHINE FOR CUTTING CORN PADS.
APPLICATION FILED JULY 23, 1917.
1,269,619.
Patented June 18, 1918.
2 SHEETS—SHEET 2.
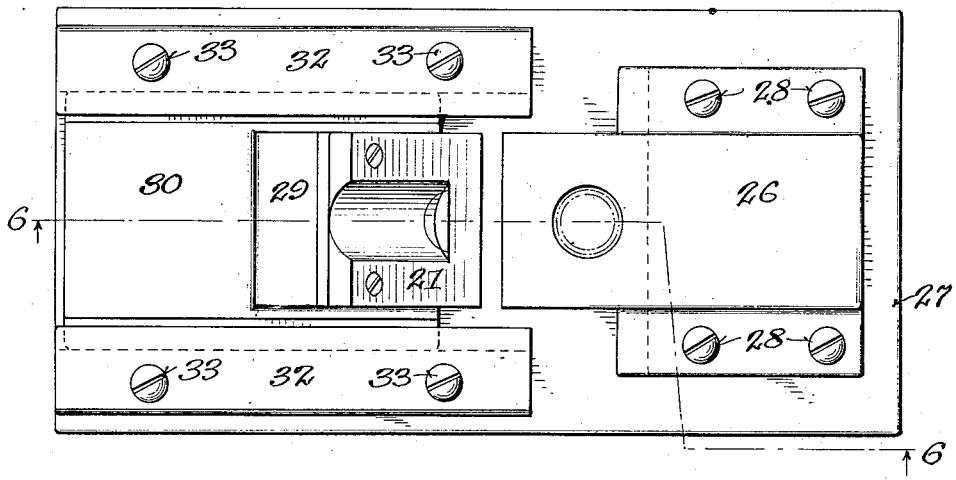
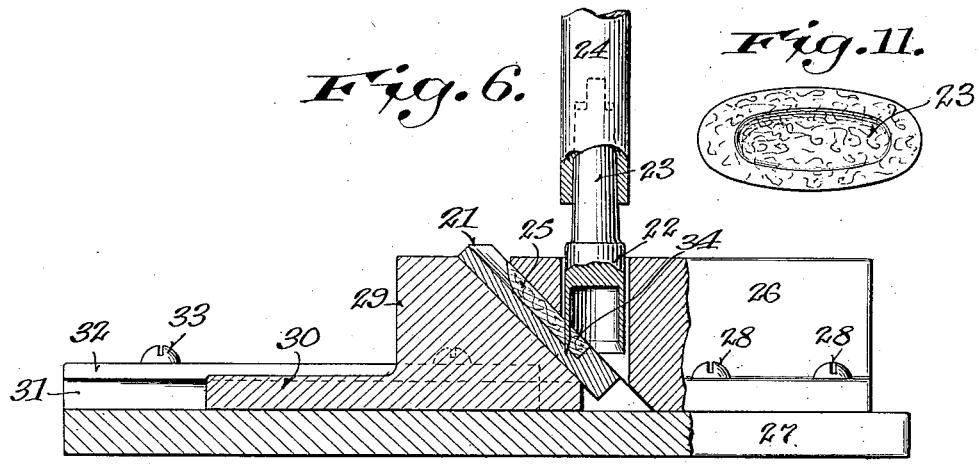
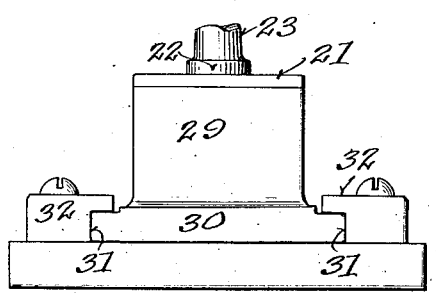
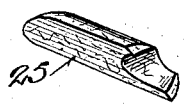
Inventor
John J. Lepper
By Erwin H. Wheeler
Attorneys.

UNITED STATES PATENT OFFICE.

JOHN J. LEPPER, OF MILWAUKEE, WISCONSIN.

MACHINE FOR CUTTING CORN-PADS.

1,269,619.   Specification of Letters Patent.   Patented June 18, 1918.

Application filed July 23, 1917. Serial No. 182,280.

*To all whom it may concern:*

Be it known that I, JOHN J. LEPPER, a citizen of the United States, residing at the city of Milwaukee, county of Milwaukee, and State of Wisconsin, have invented new and useful Improvements in Machines for Cutting Corn-Pads, of which the following is a specification.

My invention relates to improvements in machines for cutting corn pads from felt.

It will be understood that in forming corn pads several operations are necessary, one for forming the pads shown in Figure 4, which requires the action of the devices shown in Figs. 1 to 3 inclusive. After the piece shown in Fig. 4 has been formed a semi-circular piece is cut from the end of such member, as shown in Fig. 8. The construction shown in Fig. 8 requires the action of the devices shown in Figs 5 and 7. The construction of pad shown in Fig. 11 requires the action of the devices 9 and 10.

My invention is further explained by reference to the accompanying drawings, in which—

Fig. 1 represents a plan view of the device shown in Figs. 2 and 3.

Fig. 2 is a vertical section, drawn on line 2, 2 of Fig. 1.

Fig. 3 is an end view, part broken away.

Fig. 4 represents the pad which is formed from felt by the action of the devices shown in Figs. 1 to 3 inclusive.

Fig. 5 is a plan view of the device for forming a semi-circular aperture in the pad shown in Fig. 4.

Fig. 6 is a vertical section, drawn on line 6, 6 of Fig. 5.

Fig. 7 is an end view.

Fig. 8 is a perspective view of the pad as it is formed by the device shown in Figs. 5 to 7 inclusive.

Fig. 9 is a vertical section of the device for producing the first cut of the form of pad shown in Fig. 11.

Fig. 10 is the device for producing the second cut of Fig. 11, and

Fig. 11 is a plan view of one of my corn pads complete.

Like parts are identified by the same reference numerals throughout the several views.

1 represents a piece of felt in longitudinal section as it appears when being acted upon by the cutting blades. 2 represents the cutting blade which is adapted to be revolved with any ordinary drill press or similar machine. The cutting blade 2 is cylindrical in shape, and is provided with a shank 3 by which it is connected with a revoluble shank 4 of an ordinary drill press or similar machine. Said shank 3 is provided with a rectangular bearing 5 by which it is caused to revolve with the member 4 as the same is revolved. 6 is a core which is securely retained in place by the screw 7, said screw being used to connect the core 6 with the supporting plate 8. The cutting blade is adapted to enter the space 9 between the core 6 and the vertical sleeve 10. The sleeve 10 is secured to the base plate 8 by a plurality of screws 11. 12 is a vertical pressure block, the upper end 13 of which is made convex, curving outwardly away from the sleeve 10, and said vertical pressure block 12 is slidably supported from the base plate 8 by the horizontal member 14 and the retaining plates 15, whereby said member 14 is adapted to reciprocate backwardly and forwardly within the longitudinal groove 16. The plates 15 are retained in place by a plurality of screws 17.

It will now be understood that preparatory to inserting a piece of felt 1 the vertical member 12 is drawn rearwardly or toward the left, reference being had to Fig. 2. A piece of felt 1 is then inserted when the member 12 is forced forwardly with considerable pressure against the side of the felt 1, the cylindrical cutting blade 2 being, of course, withdrawn, whereby the piece of felt is forced inwardly against the core 6, as indicated in Figs. 2, 9 and 10, said felt being given the required convex shape by the concave surface 18 of the member 10. When this is done the cylindrical cutting blade 9 is lowered while it is simultaneously rapidly revolved by the shank 4, when a piece of felt 19 of the shape indicated in Fig. 4 is severed from the member 1, as indicated in Fig. 2. To prevent the cylindrical cutting blade 9 from becoming dull by contact with metal I preferably interpose a piece of fiber or other non-metallic substance 20 between the core 6 and base plate 8, whereby the cylindrical cutting blade is prevented from being dulled by contact with the metallic surface of such member 8. When the pad has been formed by the process described in the shape shown in Fig. 4 it is placed upon the angular block 21 shown in Fig. 6, said angular block being preferably formed of wood or other non-metallic substance, when such pad of felt is subjected to the action of the cylindrical cutting blade 22, said blade 22 being provided with a shank 23 which is connected with the shank 24 of a drill press or other similar mechanism, whereby said cutting blade 22 is adapted not only to be moved vertically upwardly and downwardly but also simultaneously revolved as it is forced downwardly against the corn pad 25, as shown in Fig. 6.

By the device shown in Fig. 6 a solid block of metal 26 is secured to the base plate 27 by a plurality of screws 28, and the corn pad is supported from the slidable member 29 upon the base plate 27, said member 29 being preferably provided with a horizontal member 30, which member 30 is retained in place in the groove 31 by the guide plates 32, 32. The guide plates 32, 32 are secured to the base plate 27 by a plurality of screws 33. By the device shown in Figs. 5 and 6 no central core is required within the cutting blade 22 as is the case by the device shown in Fig. 2. This is owing to the fact that the piece of material 34 which is severed by the revoluble and downward action of the cutting blade is not thereafter used, and for this reason it becomes unnecessary to hold it in any particular shape as it is being operated upon.

It will, of course, be understood that the felt pad is forced forwardly, as indicated in Figs. 2 and 6 by the manual action of the user, and the user may adopt any peculiar form of mechanism for accomplishing such purpose as may be found advisable.

It will also be understood that any suitable form of mechanism may be used for communicating a revoluble movement to the cutting blades.

Fig. 11 shows a form of pad formed by the devices shown in Figs. 9 and 10, the pad 1 being first forced forwardly by the slidable member 12. The pad 1 is given the curved shape shown in Fig. 9, when the revolving cutting blade 2 is forced downwardly against said pad, whereby the first cut is produced which forms the concave depression 23, shown in Fig. 11. When a large number of said cuts have been produced I remove the central core 6 shown in Fig. 9, and replace the same with the core 6 shown in Fig. 10, when the revolving cutting blade 2 is again lowered, whereby the exterior cut, indicated by dotted lines 24 in Fig. 9, is produced, whereby pads of the form shown in Fig. 11 are completed.

Having thus described my invention what I claim as new and desire to secure by Letters Patent, is:—

1. In a device of the described class, the combination of a supporting base, a fixed member provided with a cylindrical aperture secured to said base, a former slidably secured to said base and adapted to force a piece of felt into one side of said cylindrical aperture, a cylindrical cutting blade, and means for revolving said blade and moving the same downwardly as it is being revolved.

2. In a device for the described class, the combination of a supporting base, a fixed member provided with a cylindrical aperture secured to said base, a former slidably secured to said base and adapted to force a piece of felt into one side of said cylindrical aperture, a cylindrical cutting blade, a stationary core affixed to said base within said cylindrical aperture, and means for revolving said blade and simultaneously moving the same downwardly.

3. In a device of the described class, the combination of a supporting base, a fixed member provided with a cylindrical aperture secured to said base, a former slidably secured to said base and adapted to force a piece of felt into one side of said cylindrical aperture, a pair of guide members secured to said base and adapted to guide said former as the latter is used for forcing felt beneath one side of a cylindrical cutting blade, a cylindrical cutting blade, and means for revolving said blade as the same is being forced downwardly.

4. In a device of the described class, the combination of a supporting base, a fixed member provided with a cylindrical aperture secured to said base, a former slidably secured to said base and adapted to force a piece of felt into one side of said cylindrical aperture, a cylindrical cutting blade, means for revolving said blade and simultaneously moving the same downwardly, a removable core secured to said base within said cylindrical aperture, a pair of guide members secured to said base and adapted to guide said former as it is being moved toward and from said cylindrical cutting blade, all substantially as and for the purpose specified.

In testimony whereof I affix my signature in the presence of two witnesses.

JOHN J. LEPPER.

Witnesses:
O. C. WEBER,
JAS. B. ERWIN.

Copies of this patent may be obtained for five cents each, by addressing the "Commissioner of Patents, Washington, D. C."